US008678747B2

United States Patent
Ni et al.

(10) Patent No.: US 8,678,747 B2
(45) Date of Patent: Mar. 25, 2014

(54) BRAKE MECHANISM FOR AIR TURBINE STARTER

(75) Inventors: Weishun Ni, Rockton, IL (US); Jeffrey A. Stadler, Roscoe, IL (US); Jody A. Peterson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1055 days.

(21) Appl. No.: 12/700,337

(22) Filed: Feb. 4, 2010

(65) Prior Publication Data

US 2011/0188997 A1 Aug. 4, 2011

(51) Int. Cl.
*F01B 25/00* (2006.01)

(52) U.S. Cl.
USPC .......................................... 415/18; 416/169 R

(58) Field of Classification Search
USPC ........................... 415/18, 19; 416/152, 169 R
See application file for complete search history.

(56) References Cited

U.S. PATENT DOCUMENTS

| 2,987,296 A | * | 6/1961 | Ferguson, Jr. ...................... 415/9 |
| 3,203,514 A | * | 8/1965 | Davies et al. .................. 188/170 |
| 5,042,963 A | * | 8/1991 | Sorenson et al. ............... 415/18 |

* cited by examiner

*Primary Examiner* — Dwayne J White
(74) *Attorney, Agent, or Firm* — Cantor Colburn LLP

(57) ABSTRACT

A brake assembly (44) for an air turbine starter (10) includes a brake cylinder (46) located in the air turbine starter (10). A brake piston (48) is located at least partially within the brake cylinder (46) and slidable therein. A biasing member (50) biases the brake piston (48) toward a turbine wheel (12) of the air turbine starter (10) applying a braking force to the turbine wheel (12) and defining a piston chamber (58) between the turbine wheel (12) and the brake piston (48). A through opening (56) in the brake piston (48) into the piston chamber (58) is configured such that a flow of fluid through the through opening (56) into the piston chamber (58) applies a force to the brake piston (48) sufficient to overcome the bias thereby allowing rotation of the turbine wheel (12).

17 Claims, 3 Drawing Sheets

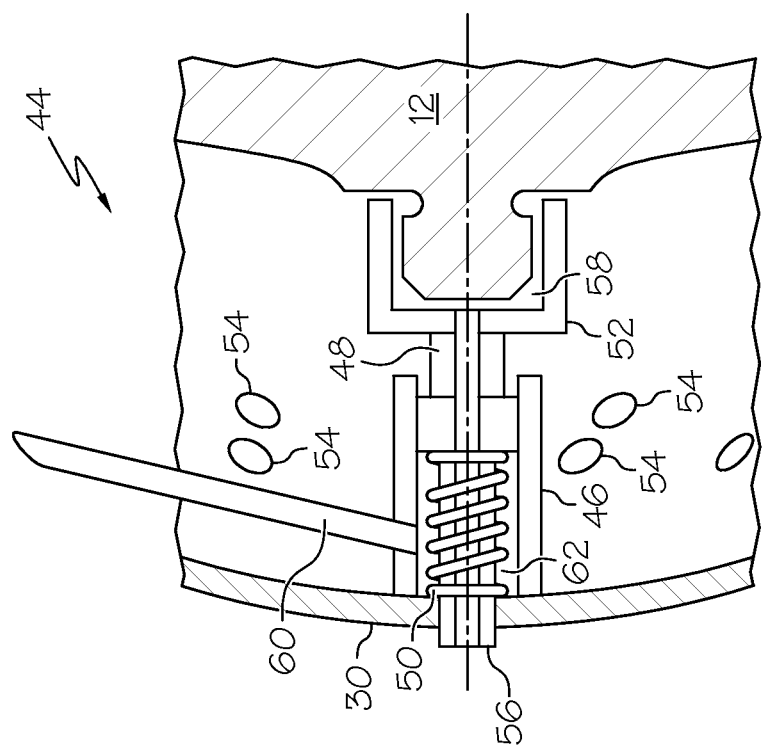

BRAKE MECHANISM FOR AIR TURBINE STARTER

BACKGROUND OF THE INVENTION

The subject matter disclosed herein generally relates to air-driven turbine starters. More specifically, the subject disclosure relates to braking mechanisms for air-driven turbine starters.

Aircraft engines, for example, gas turbines, are typically equipped with an air-driven turbine starter mounted on the accessory gearbox, whose purpose is to bring the turbine up to a light-off speed prior to ignition of the engine combustor. The turbine starter is driven by pressurized air provided by an air source such as an auxiliary power unit, another operating engine, or an external air cart connected to the turbine starter. Pressurized air fed into the turbine starter drives is converted to mechanical power causing rotation of a starter output shaft. The starter output shaft transmits this rotation to the drive shaft of the accessory gearbox. Rotation of the gearbox shaft drives the engine which induces airflow into the engine. When the engine rotation reaches a desired speed, combustion is initiated and assists the starter in engine acceleration until the turbine starter is no longer necessary. The flow of pressurized air into the air turbine starter is thus cut off, causing rotation of the starter shaft to slow. As the starter shaft slows, the starter is disengaged via the action of a clutch internal to the turbine starter, for example, a synchronous engagement clutch (SEC) as described in U.S. Pat. No. 5,419,420. The SEC operates by moving clutch elements associated with the starter shaft away from clutch elements associated with the gearbox shaft as the rotation of the starter shaft slows. During the disengagement process, the clutch elements associated with the starter shaft ratchet along the clutch elements associated with the gearbox shaft until the starter shaft slows sufficiently to move the clutch elements associated with the starter shaft a necessary distance to achieve full disengagement. The ratcheting during clutch disengagement contributes to wear of said clutch elements. As such, to reduce wear on the clutch elements and extend their service lives, it is desirable to reduce turbine starter speed quickly so that clutch engagement/disengagement and thus ratcheting time is reduced.

BRIEF DESCRIPTION OF THE INVENTION

According to one aspect of the invention, a brake assembly for an air turbine starter includes a brake cylinder located in the air turbine starter. A brake piston is located at least partially within the brake cylinder and slidable therein. A biasing member biases the brake piston toward a turbine wheel of the air turbine starter applying a braking force to the turbine wheel and defining a piston chamber between the turbine wheel and the brake piston. A through opening in the brake piston into the piston chamber is configured such that a flow of fluid through the opening into the piston chamber applies a force to the brake piston sufficient to overcome the bias thereby allowing rotation of the turbine wheel.

According to another aspect of the invention, an air turbine starter includes a housing having an inlet receivable of a flow of fluid and a turbine wheel disposed therein including a plurality of turbine blades. A starter shaft is operably connected to the turbine wheel such that rotation of the turbine wheel drives rotation of the starter shaft. A brake assembly disposed in the housing includes a brake cylinder and a brake piston disposed at least partially within the brake cylinder and slidable therein. A biasing member biases the brake piston toward the turbine wheel applying a braking force to the turbine wheel and defining a piston chamber between the turbine wheel and the brake piston. A through opening in the brake piston into the piston chamber is configured such that a flow of fluid through the through opening into the piston chamber applies a force to the brake piston sufficient to overcome the bias thereby allowing rotation of the turbine wheel.

According to yet another aspect of the invention, a method of controlling rotation of a turbine wheel of an air turbine starter includes locating a brake assembly at a housing of the air turbine starter. The brake assembly includes a brake cylinder, a brake piston located at least partially within the brake cylinder and slidable therein, and a biasing member configured to bias the brake piston toward the turbine wheel. A braking force is applied to the turbine wheel sufficient to resist rotation of the turbine wheel due to the action of a biasing member on the brake piston.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is an enlarged view of a portion of the air turbine starter of FIG. 2.

The detailed description explains embodiments of the invention, together with advantages and features, by way of example with reference to the drawings.

DETAILED DESCRIPTION OF THE INVENTION

Figure 1:
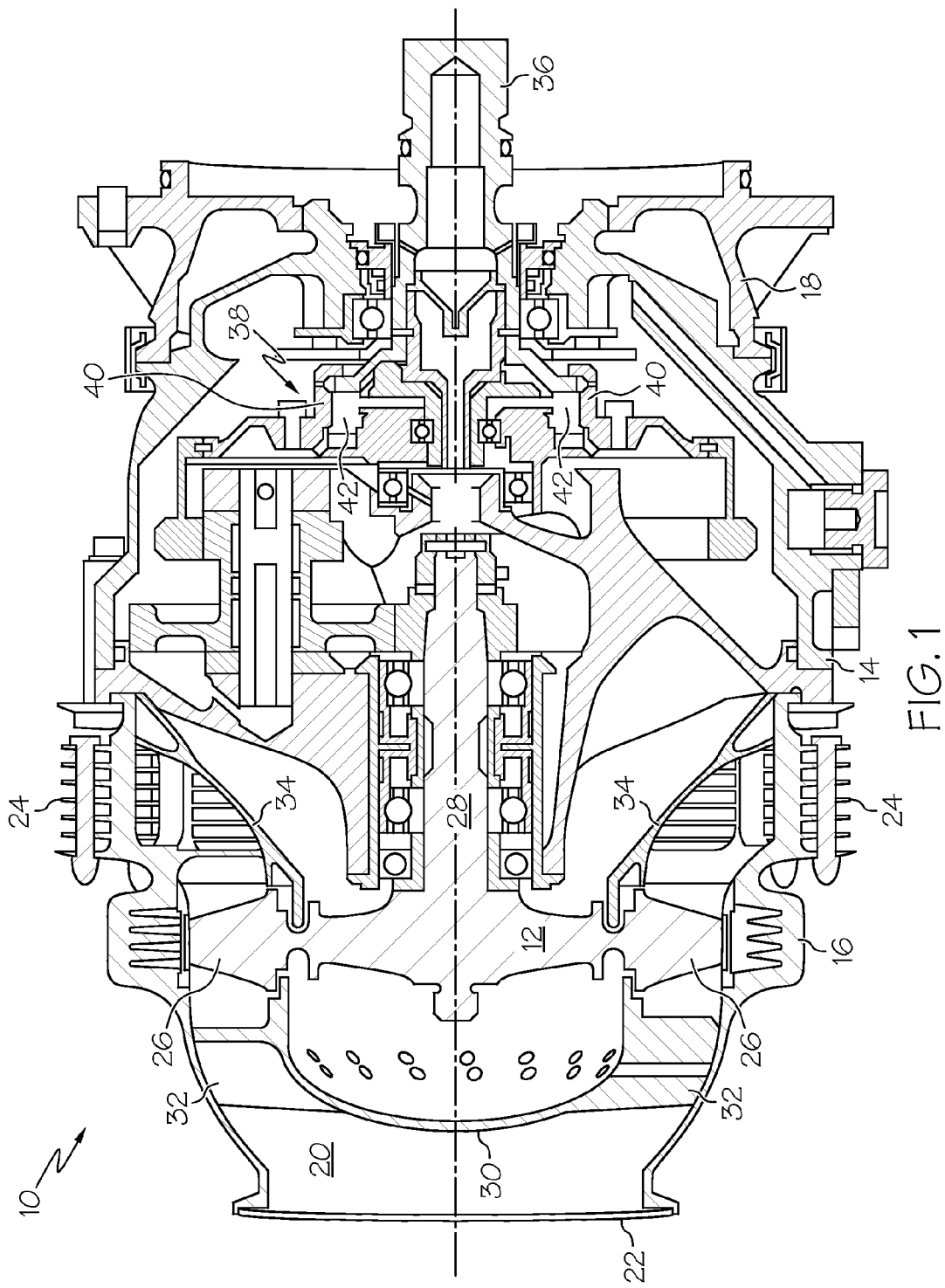
FIG. 1 is a cross-sectional view of an embodiment of an air turbine starter.

Shown in FIG. 1 is an embodiment of an air turbine starter 10. The air turbine starter 10 includes a turbine wheel 12 that is driven by a compressed gas, from a source such as an auxiliary power unit (APU), another operating engine, or an external air cart. The air turbine starter 10 has a gear housing 14 disposed between and mounted to an inlet housing 16 and a transmission housing 18. The inlet housing 16 defines a flow chamber 20 having a flow inlet 22, through which the compressed gas enters the air turbine starter 10, and a flow outlet 24. The turbine wheel 12 is disposed in the flow chamber 20 between the flow inlet 22 and the flow outlet 24 and includes a plurality of blades 26 disposed circumferentially around the turbine wheel 12. The turbine wheel 12 further includes a central axially-extending starter shaft 28. The turbine wheel 12 is mounted to the starter shaft 28 such that the starter shaft 28 is driven in rotation about its axis as the turbine wheel 12 is driven to rotate about its axis by the compressed gas passing through the plurality of blades 26 to the flow outlet 24. A turbine shield 30, having a plurality of stator vanes 32 disposed circumferentially thereabout, is disposed in the flow chamber 20 upstream of the stator wheel 12 to direct the compressed gas from the flow inlet 22 toward the plurality of blades 26 in a desired manner. In some embodiments, a flow deflector 34 may be disposed in the flow chamber 20 downstream of the turbine wheel 12 to direct the compressed gas toward the flow outlet 24.

The energy extracted from the compressed gas via the turbine wheel 12 is transmitted via the starter shaft 28 into an output shaft 36 via a clutch assembly 38. In the embodiment shown in FIG. 1, the clutch assembly 38 is a synchronous engagement clutch, but other types of clutches are contemplated within the scope of the present disclosure. The clutch assembly 38 includes a starter spline 40 associated with and connected to the starter shaft 28 and an input spline 42 associated with and connected to the output shaft 36. The starter spline 40 is biased toward engagement with the input spline 42 when the air turbine starter 10 is operating until a cut-off speed of the starter shaft 28 is reached. At that speed, the supply of compressed gas to the air turbine starter 10 is stopped and the clutch assembly 38 begins to disengage. Complete disengagement of the clutch assembly 38 occurs when the turbine shaft 28 stops rotating.

Figure 2:
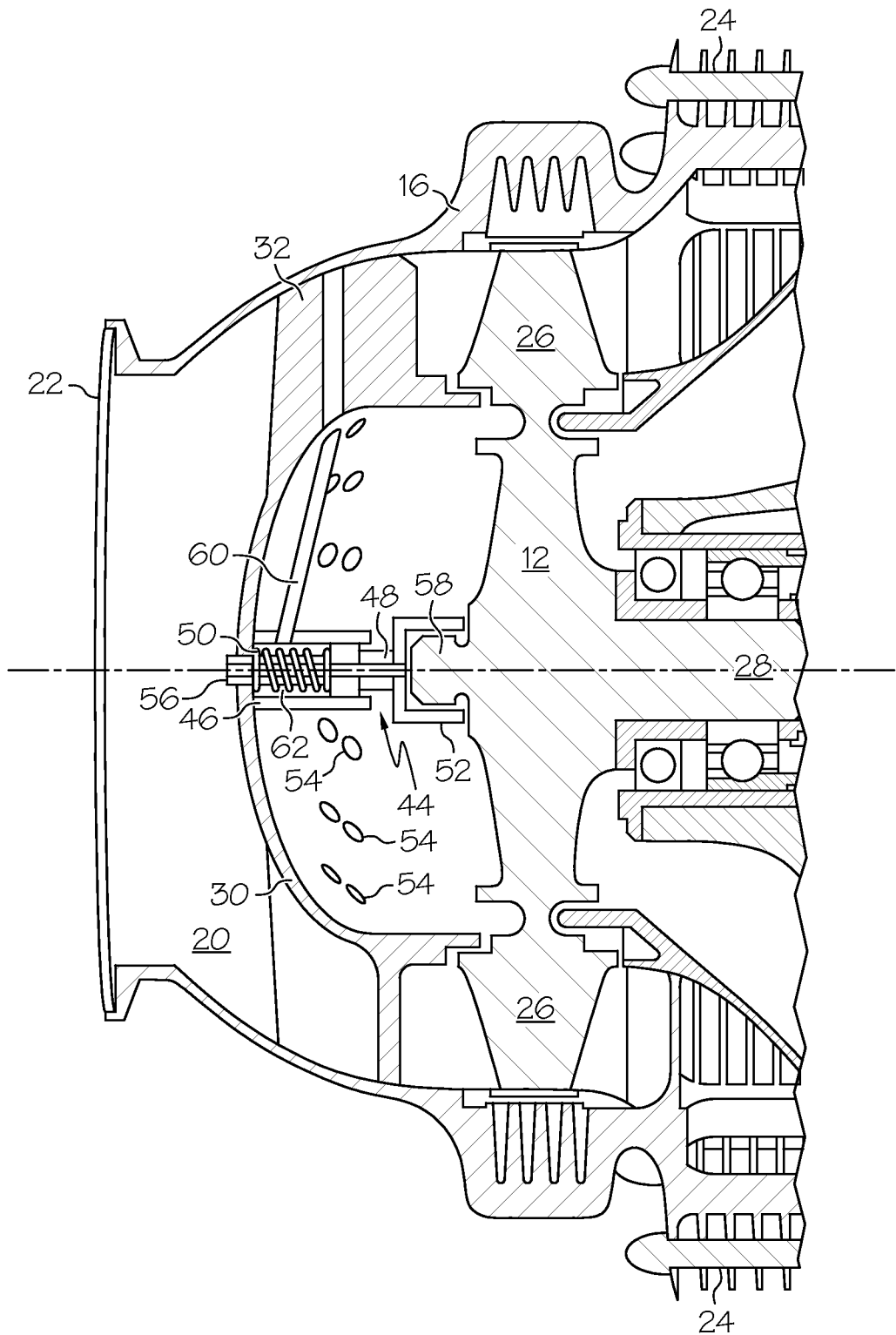
FIG. 2 is a partial cross-sectional view of an embodiment of an air turbine starter.

Referring to FIG. 2, to speed complete disengagement of the clutch assembly 38 of FIG. 1, the air turbine starter 10 includes a turbine brake 44. The turbine brake 44 is disposed between the turbine shield 30 and the turbine wheel 12. Referring now to FIG. 3, the turbine brake 44 is shown in more detail. The turbine brake 44 includes a brake cylinder 46 affixed to the turbine shield 30. A brake piston 48 is disposed in the brake cylinder 46 and biased toward the turbine wheel 12 by, for example, a coil spring 50 or other means located in a spring cavity 62. The coil spring 50 is also generally referred to as biasing member 50, and the spring cavity 62 is also referred to as bias cavity 62. A piston arm 52 is attached to the brake piston 48. The piston arm 52 is configured such that the piston arm 52 contacts the turbine wheel 12 and applies a braking force thereto when there is no flow of compressed gas into the air turbine starter 10, thus preventing rotation of the turbine wheel 12.

When operation of the air turbine starter 10 is begun and compressed gas is flowed through the flow inlet 22, a portion of the compressed gas flows through a plurality of shield holes 54 in the turbine shield 30. The brake piston 48 includes a pipe hole 56 which, in some embodiments, extends along a length of the brake piston 48. The pipe hole 56, also referred to as through opening 56, allows the compressed gas to enter a piston chamber 58 between the piston arm 52 and the turbine wheel 12. The compressed gas entering the piston chamber 58 sufficiently pressurizes the piston chamber 58 to, for example, about 30 pounds per square inch, to overcome the bias force of the coil spring 50 and forces the brake piston 48 and piston arm 52 away from the turbine wheel 12 thus allowing the turbine wheel 12 to rotate. In some embodiments, the turbine brake 44 includes at least one air release 60 which extends from the brake cylinder 46 through the stator vanes 32 and out of the inlet housing 16 as depicted in FIG. 2. The air release 60 vents the spring cavity 62 if necessary to ensure sufficient force is exerted on the brake piston 48 to ensure translation away from the turbine wheel 12.

When the air turbine starter 10 is turned off, for example, when the engine is successfully started, the flow of compressed gas through the flow inlet 22 is stopped. Consequently, flow of compressed air through the pipe hole 56 into the piston chamber 58 ceases, thus allowing the coil spring 50 to force the piston arm 52 into contact with the turbine wheel 12. The piston arm 52 applies a braking force to the turbine wheel 12 to quickly bring the turbine wheel 12 to a stop, thus reducing the disengagement time of the clutch assembly 38 to reduce wear of the clutch assembly 38. The reduction of engagement time reduces ratcheting of the teeth of the starter spline 40 and the input spline 42 of FIG. 1, thereby reducing wear.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A brake assembly (44) for an air turbine starter comprising:
    a brake cylinder disposed in the air turbine starter;
    a brake piston disposed at least partially within the brake cylinder and slidable therein;
    a biasing member to bias the brake piston toward a turbine wheel of the air turbine starter applying a braking force to the turbine wheel and defining a piston chamber between the turbine wheel and the brake piston; and
    a through opening in the brake piston into the piston chamber configured such that a flow of fluid through the through opening into the piston chamber applies a force to the brake piston sufficient to overcome the bias thereby allowing rotation of the turbine wheel;
    wherein the fluid flow is a compressed gas.

2. The brake assembly of claim 1 wherein the brake piston is configured to travel axially away from the turbine wheel when the bias is overcome.

3. The brake assembly of claim 1 wherein the biasing member is a coil spring.

4. The brake assembly of claim 1 wherein the biasing member is disposed at a bias cavity in the brake cylinder.

5. The brake assembly of claim 4 including at least one release opening disposed at the brake cylinder to prevent pressurization of bias cavity.

6. An air turbine starter comprising:
    a housing having an inlet receivable of a flow of fluid;
    a turbine wheel disposed in the housing the turbine wheel including a plurality of turbine blades disposed threat, the flow of fluid driving rotation of the turbine wheel;
    a starter shaft operably connected to the turbine wheel such that rotation of the turbine wheel drives rotation of the starter shaft; and
    a brake assembly including:
    a brake cylinder disposed in the housing;
    a brake piston disposed at least partially within the brake cylinder and slidable therein;
    a biasing member go bias the brake piston toward the turbine wheel applying a braking force to the turbine wheel and defining a piston chamber between the turbine wheel and the brake piston; and
    a through opening in the brake piston into the piston chamber configured such that the flow of fluid through the inlet and through the through opening into the piston chamber applies a force to the brake piston sufficient to overcome the bias thereby allowing rotation of the turbine wheel.

7. The air turbine starter of claim 6 further comprising an output shaft in operable communication with the starter shaft via a clutch assembly.

8. The air turbine starter of claim 7 wherein the clutch assembly is a synchronous engagement clutch.

9. The air turbine starter of claim 7 where engagement of the brake assembly to stop rotation of the turbine wheel disengages the clutch assembly between the starter shaft and the output shaft.

10. The air turbine starter of claim 6 wherein the biasing member is a coil spring.

11. The air turbine starter of claim 6 wherein the brake piston is configured to travel axially away from the turbine wheel when the bias is overcome.

12. The air turbine starter of claim 6 wherein the biasing member is disposed at a bias cavity in the brake cylinder.

13. The air turbine starter of claim 12 including at least one release disposed at the brake cylinder to prevent over pressurization of the brake cylinder.

14. The air turbine starter of claim 13 wherein the at least one release extends through at least one stator member disposed between the inlet and the turbine wheel.

15. The air turbine starter of claim 6 wherein the flow of fluid is compressed gas.

16. A method of controlling rotation of a turbine wheel of a air turbine starter comprising:

disposing a brake assembly at a housing of the air turbine starter, the brake assembly including:
    a brake cylinder;
    a brake piston disposed at least partially within the brake cylinder and slidable therein; and
    a biasing member configured to bias the brake piston (48) toward the turbine wheel;
  applying a braking force on the turbine wheel sufficient to resist rotation of the turbine wheel due to the action of a biasing member on the brake piston;
  injecting a flow of fluid into an inlet of the air turbine starter to drive rotation of the turbine wheel;
  flowing a portion of the flow of fluid into piston chamber defined between the turbine wheel and the brake piston; and
  overcoming the braking force via pressurization of the piston chamber by urging the brake piston away from the turbine wheel to allow rotation of the turbine wheel.

17. The method of claim 16 wherein the flow of fluid is injected into the piston chamber via one or more through openings in the brake piston.

* * * * *